Sept. 22, 1964  H. J. POOL  3,149,450
FORAGE HARVESTER
Filed Aug. 28, 1962  3 Sheets-Sheet 1

HERALD J. POOL
INVENTOR
HUEBNER & WORREL
ATTORNEYS
BY Richard M. Worrel

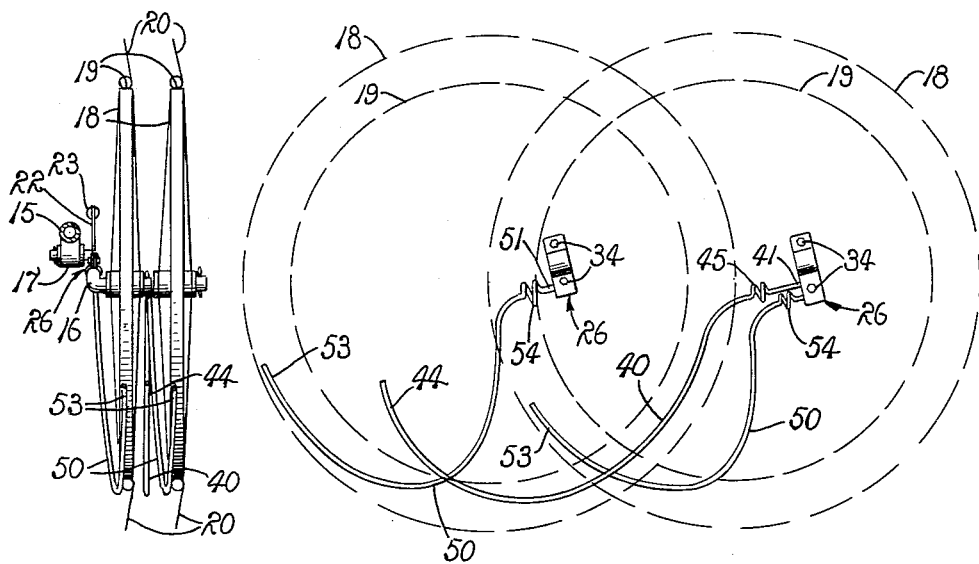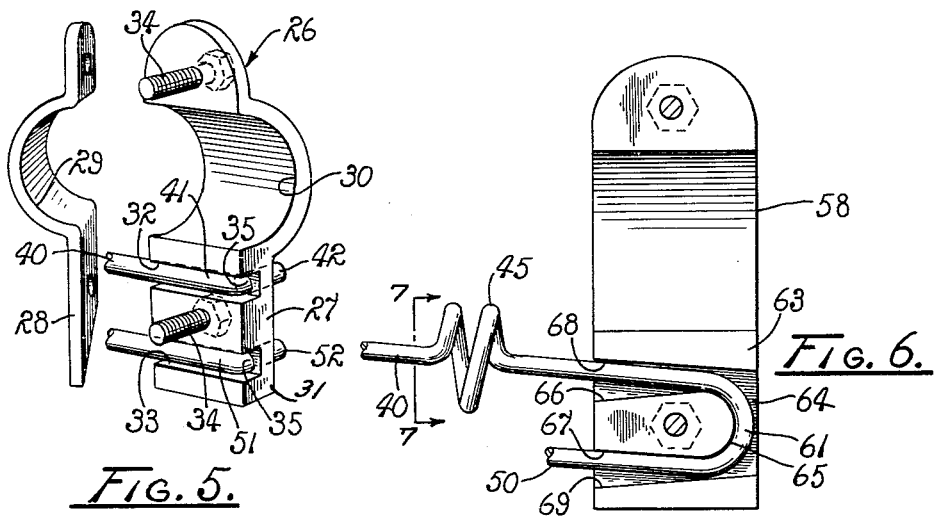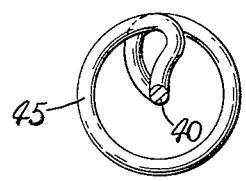

Sept. 22, 1964     H. J. POOL     3,149,450
FORAGE HARVESTER
Filed Aug. 28, 1962     3 Sheets-Sheet 3
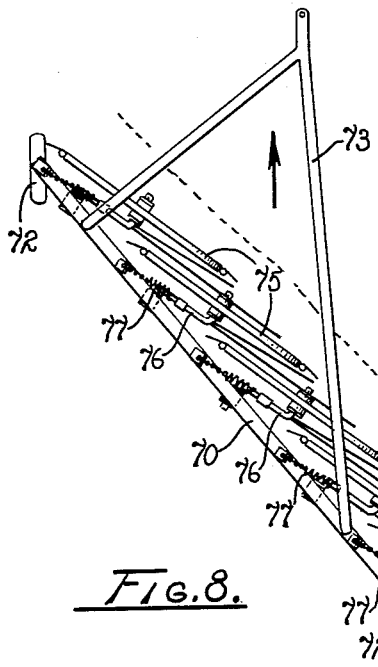
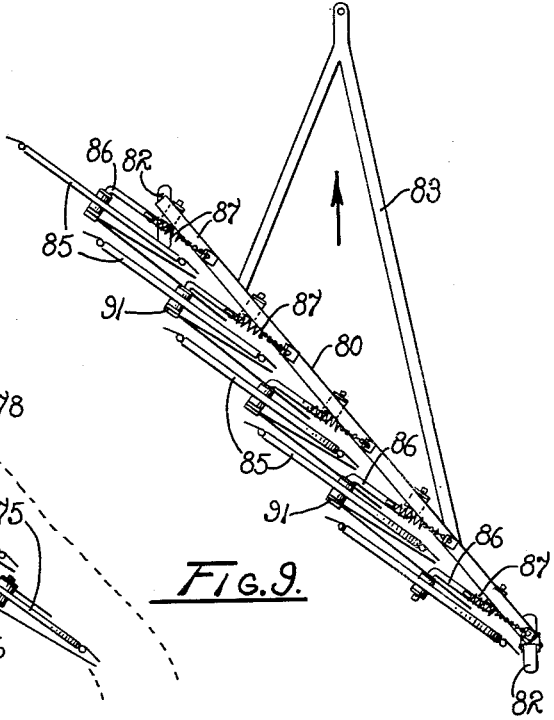
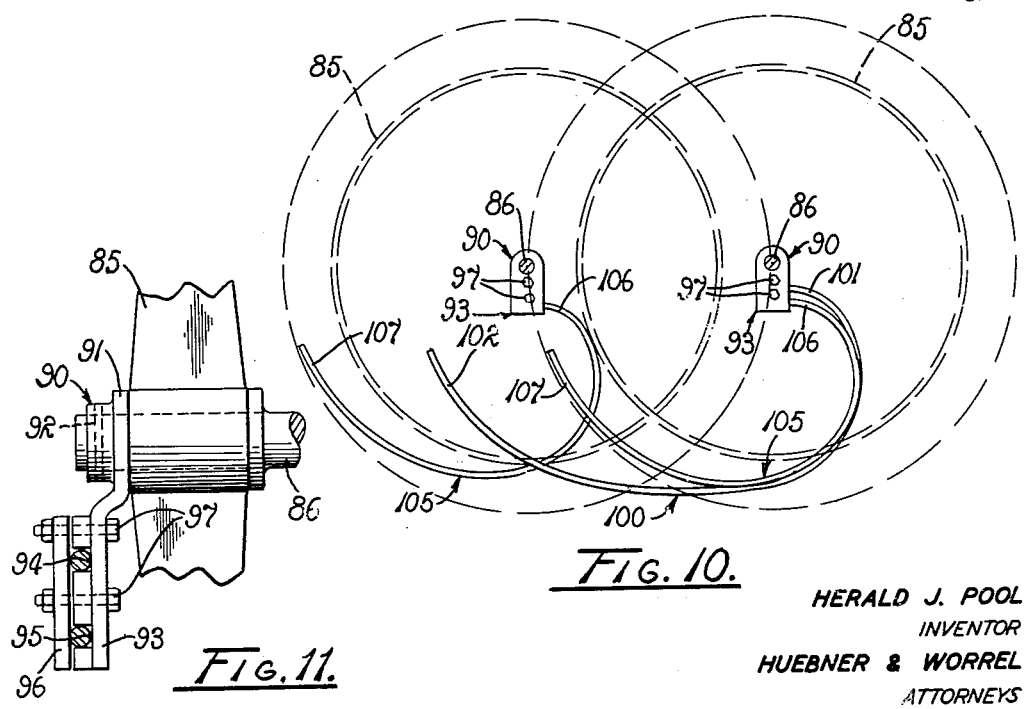
HERALD J. POOL
INVENTOR
HUEBNER & WORREL
ATTORNEYS
BY
Richard M. Worrel 3,149,450
FORAGE HARVESTER
Herald Jason Pool, Tulare, Calif.
(1656 Timothy Lane, Yuba City, Calif.)
Filed Aug. 28, 1962, Ser. No. 219,960
15 Claims. (Cl. 56—377)

The present invention relates to a forage harvester having a plurality of rotary ground engaging toothed raking wheels and more particularly to such a harvester providing forage guide members adjacent to each of the raking wheels which engage forage subsequent to displacement by the wheels.

Although forage harvesters having raking wheels of the type disclosed in the Morrill Patent No. 2,447,354 have made a great advance in the art, certain operating conditions suggest the need for improvement. Such harvesters provide a mobile frame which, in some models, is carried forwardly of an earth traversing tractor and in other models is pulled in trailing relation thereto. The frame mounts a plurality of rotary raking wheels which are arranged in echelon on individual axles disposed obliquely to the direction of tractor travel. During such travel, loose forage encountered by the wheels is raked, turned, and transferred laterally along the wheels into a rope-like swath for deposit into a common windrow. Various models of the rotary wheel type rake arrange the wheels for independent operation and are specifically adapted as swath turners for displacing previously raked forage. It has been found during the raking operation that forage is not always transferred from one wheel to another in the optimum condition. Frequently, the swath of forage is permitted to be displaced rearwardly against the forwardly disposed peripheral portion of each successive wheel causing the swath to follow a torturous path along the wheels. Such bending of the swath, if excessive, causes bunching, shattering, and dropping of leaves from the forage necessary to a good crop. Also, hay is frequently caught from the swath and entwined about the spokes of the wheels seriously aggravating such bunching and leaf dropping problem. Certain devices of the prior art have provided forage impervious wheel covers for attachment to the forage engaging sides of the wheels which, while precluding entanglement of forage in the spokes, have no function to maintain the swath in a continuous substantially straight condition during lateral travel along the wheels. The covers also add unncessary weight which increases the pressure of the wheel fingers against the ground, causing undesirable digging in and stirring of dust.

Another problem encountered during both the raking and swath turning operations is the accumulation of forage upon the fingers or teeth of the wheels. Such forage is carried upwardly and around the wheel, in a condition commonly referred to as "wind milling" and results in leaf shattering and hay loss. This problem is particularly onerous in windy areas where the forage entwined in the teeth is elevated during wind milling and is caught more readily by the wind.

Therefore, it is an object of the present invention to provide an improved forage harvester of the rotary wheel type which is capable of raking and windrowing encountered forage with a minimum of damage thereto.

Another object is to provide such a forage harvester which laterally displaces and forms the forage into a continuous, substantially straight, rope-like windrow along the raking wheels.

Another object is to provide such a forage harvester which is adapted to rake and windrow encountered forage with a minimum of wind milling of the forage about the raking wheels.

Another object is to provide such a forage harvester having forage guide members adjacent to the raking wheels.

Another object is to provide a forage guide member disposed on a rotary type harvester in a position to turn forage subsequent to displacement by the raking wheels thereof.

Another object is to provide a forage guide member for rotary type harvesters which is engagable with the teeth of the wheels in eccentric relation thereto to minimize the accumulation of forage thereon.

Other objects and advantages of the present invention will become more fully apparent in the subsequent description in the specification.

In the drawings:

FIG. 3 is a side elevation of the harvester looking in a direction represented by the line 3—3 of FIG. 1.

FIG. 4 is a rear elevation of the harvester showing the forage guide members of the present invention and their mounting brackets adjacent to the raking wheels.

FIG. 5 is a somewhat enlarged exploded perspective of the guide member mounting bracket of FIG. 4.

FIG. 6 is a modified form of the guide member mounting bracket of FIG. 5.

FIG. 7 is a transverse vertical section through a guide member taken on line 7—7 of FIG. 6.

FIG. 8 is a top plan view of a wheel type rotary rake embodying the principles of the present invention adapted to be pulled in trailing relation behind an earth traversing vehicle.

FIG. 9 is a top plan view of a pull type rotary rake of a form having a forwardly disposed frame requiring a different guide member mounting bracket from that shown in the preceding figures.

FIG. 10 is a fragmentary side elevation of the forage guide members and mounting brackets employed in the form of the rake of FIG. 9.

FIG. 11 is a somewhat enlarged rear elevation of the guide member mounting bracket of FIGS. 9 and 10.

Figure 1:
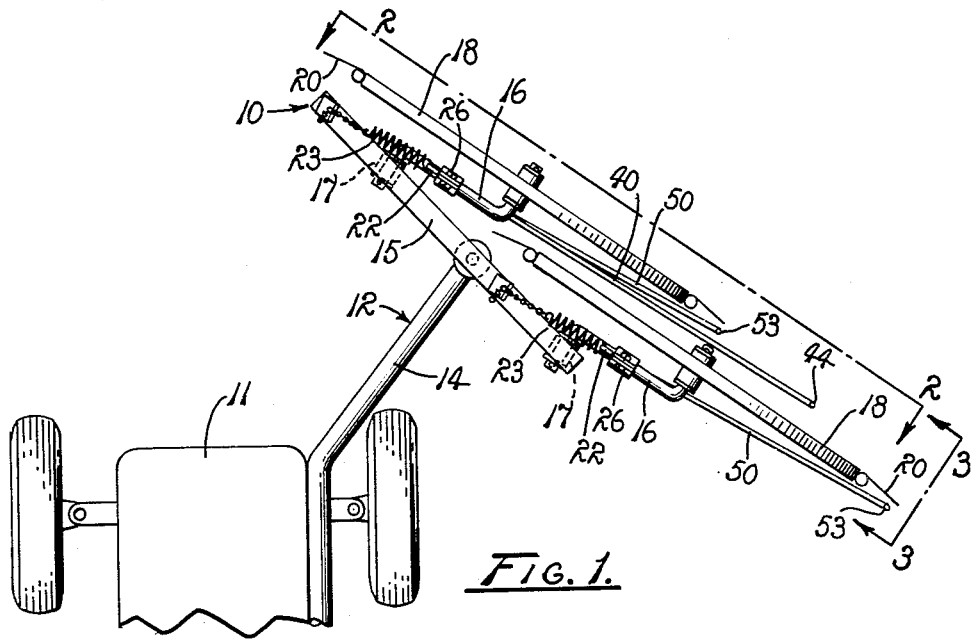
FIG. 1 is a top elevation of the forage harvester of the present invention shown mounted forwardly of an earth traversing vehicle, such as a tractor.

With particular reference to FIG. 1 of the drawings, a rotary wheel type rake 10 is adapted to be carried on the forward end of an earth traversing vehicle, such as a tractor 11. The rake includes an elongated frame 12 having an arm 14 mounted on the tractor in forwardly outwardly extended relation therefrom which mounts a mounting beam 15 in substantially normal relation thereto in a plane obliquely related to the direction of earth traversing movement of the tractor. A pair of crank axles 16 is mounted in longitudinally spaced relation at their inner pivot ends on the mounting beam by bearing blocks 17 which are secured to the beams by bolts or other suitable fastening means. The outer swinging ends of the crank axles individually rotatably support a pair of spoked raking wheels 18 which is arranged in overlapping echelon relation and disposed obliquely to the direction of vehicle movement. Each of the wheels provides an outer periphery 19 which supports a plurality of circumferentially spaced substantially radially extended teeth 20, the outer ends of which are disposed in earth engagement for rotating the wheels on their individual axes in a clockwise direction, as viewed in FIG. 2, incident to earth traversing movement of the vehicle in a forward direction. Each of the crank axles also provides a substantially upright lever 22 which is connected to the beam 15 through a tension spring 23 thereby resiliently to support the wheels thereon and by substituting springs of different spring rates to adjust the pressure of the teeth upon the ground.

As best shown in FIGS. 4 and 5, a forage guide mechanism is associated with each of the wheels 18 of the harvester and includes a divided mounting bracket 26 having opposite body and cover portions 27 and 28, respectively. The body and cover portions have corresponding upper arcuately curved portions 29 which, when assembled, provide a circular opening 30 to fit about the crank axle 16. The body 27 provides a lower portion 31 which has a pair of spaced upper and lower transversely extended notches 32 and 33, respectively, in substantially parallel relation to the axis of the opening 30. A pair of upper and lower fastening bolts 34 is extended through aligned apertures in the body and cover portions of the bracket in order to hold the same in clamping relation about the crank axle 16. The body also has a pair of holes 35 therethrough individually registered with the notches 32 and 33.

Figure 2:
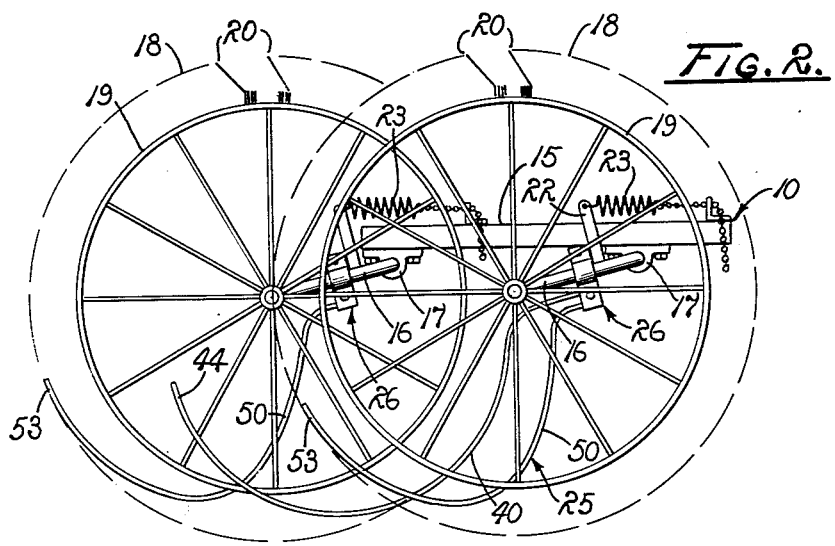
FIG. 2 is a front elevation of the harvester looking in a direction represented by the line 2—2 of FIG. 1.

As best shown in FIG. 2, the forage guide mechanism provides an elongated flexible rod-like forage turning tine 40 which includes an inner mounting portion 41 having a right angularly disposed end portion 42. The turning tine also includes a continuous lower arcuately curved outer end 44 of a radius substantially identical to the radius of the raking wheels 18. The turning tine is constrained in spaced substantially parallel relation to the forwardmost wheel by the mounting bracket 26. The mounting portion 41 of the turning tine is received within the upper notch 32 of the bracket with the inner end portion 42 extended through the aperture 35. With such mounting, the curved outer end 44 of the turning tine is extended downwardly to a position spaced approximately two inches from the ground and in continuing upwardly extended relation eccentrically of the rearwardmost wheel 18 for a distance approximately one-third the diameter of the wheel. The turning tine also preferably includes an integral loop portion 45 adjacent to the inner mounting end thereof to augment the resiliency of the tine and to dampen or to suppress resonant vibrations occurring therein incident to harvester operation.

The forage guide mechanism 25 also provides an elongated flexible rod-like stripping tine 50 which has an inner mounting portion 51 received within the lower notch 33 of the bracket and a right angularly bent inner end 52 extended through the aperture 35 therein. The stripping tine includes a continuous downwardly arcuately curved outer end portion 53 also formed with a radius substantially equal to the radius of the raking wheels 18. The inner mounting portions 41 and 51 of the tines 40 and 50 are of a diameter to project outwardly of the notches 32 and 33 of the body portion 27 of the bracket 26 so as to be tightly clamped therein by the cover 28 with tightening of the bolts 34. As shown in FIG. 4, the bracket 26 on the rearwardmost wheel 18 is shorter than the bracket on the forwardmost wheel since it needs only the lower slot 33 for singularly mounting the stripping tine 50. It is apparent that a turning tine 40 is not required in this location. The stripping tine also includes an integral loop portion 54 adjacent to its mounting portion 51 for the purposes previously described for the turning tine 40.

An alternative form of the divided mounting bracket 26 is indicated at 58 in FIG. 6 for mounting on the crank axles 16 of the forwardmost wheel 18. In such form, the turning tine 40 and the stripping tine 50 are formed of a continuous rod to provide a return-bent bight portion 61. Also, the divided bracket provides a body portion 63 which has a tine restraining groove 64 therein. The body provides an arcuately curved surface 65 within the groove for engagement by the bight portion 61 of the rod and oppositely convergent inner stop surfaces 66 and 67. The groove is further defined by upper and lower outer stop surfaces 68 and 69 which converge in the opposite direction to the inner stop surfaces 66 and 67 to permit rocking of the turning and stripping tines relative to the bracket and elevational adjustment relative to the ground. The bracket 58 for the rearwardmost wheel is identical although the turning tine is removed from the stripping tine with the latter retaining the bight portion 61 thereof for mounting in the bracket.

The tine arrangement of FIGS. 1 through 6 may also be adapted to a trailing pull type rotary rake as shown in FIG. 8. This model rake provides an elongated support beam 70 which is supported for earth traversing movement by a pair of wheels 72 disposed at its opposite ends. Usually one of the wheels is a caster wheel while the other wheel is locked in position to function as a rudder or guide and to resist lateral thrust of the raking wheels. A draft frame 73 is forwardly extended from the support beam for connection to the tractor. As in the forwardly carried rake of FIGS. 1 through 4, a plurality of raking wheels 75 are arranged forwardly of the support member in overlapping echelon arrangement. Each of the wheels is individually supported thereon by a crank axle 76. The axles rotatably support the wheels in spaced substantially parallel planes obliquely related to the direction of vehicle movement. Also, the wheels are adapted to float relative to the support beam by tension springs 77 connected between the beam and each of the crank axles 76. A windrow of forage is indicated at 78 forwardly of the raking wheels 75 and is laterally extended in substantial straight line configuration in a plane touching the rearward peripheries of the wheels 75.

*Second Form*

Second forms of the turning tines and the stripping tines are shown in FIGS. 9 through 11. Such modified forms are necessary to adapt the tines of the present invention to a rotary rake having the raking wheels thereof disposed rearwardly of the mounting frame, as shown in FIG. 9. This rake provides a support beam 80 which is carried for earth traversing movement by a pair of caster wheels 82 at the opposite ends thereof. A draft frame 83 is forwardly extended from the support beam for connection to the tractor. The support beam mounts a plurality of raking wheels 85 identical to those previously described in the foregoing rotary rakes. The wheels are individually supported on the beam by crank axles 86 which are permitted to float relative to the frame by tension springs 87 extended between the beam and the crank axles. As in the previous models, the wheels are thereby arranged in overlapping echelon relation obliquely to the direction of frame movement. With the crank axles 86 extended laterally and forwardly from their beam mountings, an auxiliary bracket 90, as shown in FIGS. 10 and 11, is carried on each of the crank axles outwardly adjacent to its raking wheel. The bracket provides an upper bearing portion 91 which provides suitable aligned apertures therethrough for register with a diametrically disposed bore in the crank axle to receive a lock pin 92 therethrough. The bracket further includes a lower body portion 93 having a pair of vertically spaced substantially horzontally extended upper and lower notches 94 and 95, respectively, which may be of either of the forms shown in FIGS. 5 and 6 of the drawings. A cover 96 is disposed in superimposed relation upon the body portion 93 thereof by a pair of spaced lock bolts 97 extended therethrough.

An elongated flexible rod-like turning tine 100 has an arcuately curved return-bent inner end 101 receivable in the upper notch 94 and a continuously extended outer curved end 102. Also, an elongated flexible rod-like stripping tine 105 has an inner arcuately curved end 106 receivable in the lower notch 95 and a continuously extended arcuately curved outer end 107. The outer ends of the stripping tines are formed identically to the tines 40 and 50 of the first form but are return arcuately curved at their inner ends for mounting on the crank axles of their respective wheels by the brackets 90. Such modification is necessary so as to dispose the outer ends of the tines in substantially the same position relative to the wheels as in the first form of the invention.

Operation

The operation of the described embodiments of the subject invention is believed to be readily apparent and is briefly summarized at this point. The outer operating ends of the turning tines 40 and 100 and the outer operating ends of the stripping tines 50 and 105 are disposed in an identical manner adjacent to their respectively raking wheels. As suggested by the several models of the rotary wheel type rakes illustrated, it will be apparent that the turning and stripping tines may be employed on a wide variety of wheel rakes and forage harvesters regardless of the type of wheel mounting employed.

Inasmuch as the operation of all the rake models shown in the drawings is identical, the description of the operation thereof will be best understood by particular reference to FIGS. 4, 8 and 9. With movement of the support beam 70 of FIG. 8 through a field of cut forage in a direction substantially aligned with the ground wheels 72, the raking wheels 75 are effective to rake and to roll encountered forage into the elongated, rope-like, windrow 78 which is transferred laterally from one wheel to another by rotary movement of the wheels in a substantially straight path of travel aligned with the rearward peripheries thereof. The windrow comes off the rearwardmost wheel for deposit in the field for baling or the like. With reference to FIGS. 4 and 10, the raking wheels 18 and 85 are rotated during such operation in a clockwise direction. In order to augment the forage turning effect of the raking wheels and maintain alignment of the forage while forming the windrow, such forage is engaged by the turning tines 40 or 100 subsequent to its displacement by their respectively preceding raking wheels. The turning tines insure substantial straight line movement of the windrow from one wheel to another to minimize bending of the swath in a torturous path during such transfer between the raking wheels.

During the above described movement of the harvesters, the stripping tines 50 or 105 engage the teeth of their respective raking wheels beginning at positions adjacent to the periphery of the wheels at the base of the teeth and progress outwardly along the teeth incident to raking wheel rotation eccentrically of their arcuate portions. Forage which normally accumulates on the teeth is thereby engaged by the stripping tines progressively to move such forage outwardly along the teeth for discharge off the tips thereof back into the swath 78. Such arrangement thereby substantially eliminates wind milling of forage over the wheels and minimizes scattering raked forage back into a previously raked area. Also, the stripping tines substantially eliminate the accumulation of forage on the teeth to an extent sufficient to interfere with rake operation. While the stripping tines are described as engaging the rake teeth, substantially the same effect is available if they are simply disposed closely adjacent thereto.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a forage harvester having a frame, means mounting the frame for earth traversing movement in a predetermined direction in relation thereto, and a substantially erect forage engaging wheel mounted on the frame for rotation in a plane oblique to said direction of movement adapted to displace encountered forage disposed on the ground, an auxiliary forage directing device comprising an elongated resiliently flexible tine, and means connected to the tine mounting the tine on the frame rearwardly of the wheel, said tine having an end portion disposed in a plane substantially parallel to the wheel in following relation to the wheel adjacent to the ground for engagement with forage displaced by the wheel.

2. In a forage harvester having a predetermined direction of earth traversing movement and a substantially erect rotary forage engaging wheel mounted for rotation about an axis oblique to said direction of earth traversing movement adapted to displace encountered forage disposed on the ground incident to said movement and rotation, an elongated forage engaging tine, means mounting the tine for earth traversing movement with said wheel and having a downwardly disposed arcuate portion adjacent to the ground and adjacent to said wheel in a plane substantially parallel to the wheel and disposed eccentrically rearwardly thereof to engage the forage following initial displacement by the wheel.

3. In a forage harvester having a frame, means mounting the frame for earth traversing movement in a predetermined direction in relation thereto, and a substantially erect forage engaging wheel mounted in the frame for rotation in a plane oblique to said direction of movement adapted to displace encountered forage disposed on the ground, an auxiliary forage directing device comprising an elongated resiliently flexible tine, and means connected to the tine mounting the tine on the frame rearwardly of the wheel, said tine having an arcuate end portion of a radius substantially equal to the radius of the wheel disposed in a plane substantially parallel to the wheel eccentrically in following relation to the wheel adjacent to the ground for engagement with forage displaced by the wheel.

4. In a forage harvester having a frame, means mounting the frame for earth traversing movement in a predetermined direction in relation thereto, a forage engaging wheel, and a crank axle pivotally mounted in the frame mounting the wheel thereon for rotation in a substantially erect plane oblique to said direction of movement and for free elevational movement, said wheel being adapted to displace encountered forage disposed on the ground, an auxiliary forage directing device comprising an elongated resiliently flexible tine, and means borne by the crank axle and connected to the tine mounting the tine rearwardly of the wheel, said tine being extended downwardly from the crank axle and providing a lower end portion disposed adjacent to the ground in a plane substantially parallel to the wheel and in following relation to the wheel for engagement with forage being displaced by the wheel.

5. In a forage harvester having a frame, means mounting the frame for earth traversing movement in a predetermined direction in relation thereto, a forage engaging wheel, and an axle mounted in the frame having the wheel journaled thereon for rotation in a substantially erect plane oblique to said direction of movement, said wheel being adapted to engage and displace forage disposed on the ground, an auxiliary forage directing device comprising an elongated resiliently flexible tine, and means borne by the axle mounting the tine on the axle rearwardly of the wheel, said tine being extended downwardly from the axe and rearwardly adjacent to the ground having an arcuate end portion disposed in a plane substantially parallel and adjacent to the wheel in following relation to the wheel for engagement with forage as it is displaced by said wheel.

6. In a forage harvester having a frame, means mounting the frame for earth traversing movement in a predetermined direction in relation thereto, a forage engaging wheel, and an axle mounted in the frame having the wheel journaled thereon for rotation in a substantially erect plane oblique to said direction of movement, said wheel being adapted to engage and displace forage disposed on the ground, an auxiliary forage turning device comprising an elongated resiliently flexible tine, and means borne by the axle mounting the tine thereon rearwardly of the wheel, said tine being extended downwardly from the axle and providing an arcuate terminal end portion adjacent to the ground disposed in a plane adjacent and substantially parallel to the wheel and rearwardly extended from the periphery of the wheel.

7. In a forage harvester having a frame adapted for earth traversing movement in a predetermined direction of travel, a plurality of rotary forage engaging wheels mounted in the frame in echelon arrangement in substantially erect parallel planes angularly related to said direction of travel, said wheels individually providing a plurality of circumferentially spaced teeth outwardly extended from the periphery thereof, said wheels being motivated in a predetermined direction of rotation incident to said frame movement to turn and laterally to gather forage in a continuous rope-like swath from one of said wheels to the other for discharge into a common windrow; a plurality of elongated flexible forage turning members having inner ends, and continuously extended arcuately curved outer ends; and means individually connected to said inner ends of the turning members mounting the same on the frame individually adjacent to each of said wheels that precede another in said echelon arrangement with said outer ends rearwardly extended and individually disposed adjacent to each of said wheels that rearwardly succeed a preceding wheel to engage and turn forage outwardly therefrom subsequent to displacement by the preceding wheels to insure continuous substantially straight line roping of the swath during passage from one wheel to the other.

8. In a forage harvester having a frame, means mounting the frame for earth traversing movement in a predetermined direction of travel; a plurality of rotary forage engaging wheels mounted in the frame in echelon in substantially erect parallel planes angularly related to said direction of travel, said wheels individually providing a plurality of circumferenitally spaced teeth outwardly extended from the periphery thereof, said wheels being motivated in a predetermined direction of rotation incident to said frame movement to turn and laterally gather forage in a continuous rope-like windrow from one of said wheels to the other for discharge into a common windrow, an elongated flexible forage engaging member having an inner bracket end and a pair of continuously substantially coextended outer ends arcuately curved coincidently with the direction of rotation of the wheels; and means connected to said inner bracket end of the forage engaging member mounting the same on the frame adjacent to one of said wheels, one of said outer ends of the forage engaging member being extended from said mounting means in overlying radially outwardly sliding engagement along said teeth of the wheels adjacent to said mounting means, said other outer end of the forage engaging member extended rearwardly of said wheel to engage forage subsequent to displacement by the wheel to insure continuous substantially straight line roping of the windrow during passage from one wheel to the other.

9. In a forage harvester having a predetermined direction of earth traversing movement and a plurality of substantially erect rotary forage engaging wheels mounted for rotation on individual axes obliquely to said direction of earth traversing movement, said wheels being adapted to displace encountered forage disposed on the ground incident to said movement and rotation, a plurality of elongated forage engaging tines, means individually mounting said tines adjacent to said wheels for earth traversing movement therewith, each of said tines having a downwardly disposed arcuate portion adjacent to the ground in a plane substantially parallel to its respective wheel and positioned rearwardly ececntrically thereof to engage the forage following initial displacement by its respective wheel.

10. In a forage harvester having a predetermined direction of earth traversing movement and a plurality of substantially erect rotary forage engaging wheels arranged in echelon and mounted for rotation on individual axes obliquely to said direction of earth traversing movement, said wheels being adapted to displace encountered forage disposed on the ground progressively from one wheel to another laterally of said earth traversing movement incident to said movement and rotation, a plurality of elongated forage engaging tines having inner ends, means mounting said inner ends of the tines individually behind said wheels for earth traversing movement therewith, each of said tines having a downwardly disposed arcuate portion extended from its inner end rearwardly adjacent to the ground in a plane substantially parallel to its respective wheel and positioned eccentrically thereof to engage the forage following displacement by the wheel.

11. In a forage harvester having a predetermined direction of earth traversing movement and a plurality of substantially erect rotary forage engaging wheels arranged in echelon and mounted for rotation on individual axes obliquely to said direction of earth traversing movement, a plurality of circumferentially spaced forage engaging teeth mounted on the wheels in outwardly extended relation from the periphery thereof and having outer ends, said wheels being adapted to displace encountered forage disposed on the ground progressively from one wheel to another laterally of said earth traversing movement incident to said movement and rotation, a plurality of elongated forage engaging tines having inner ends and arcuately curved tapered outer ends, means mounting said inner ends of the tines individually behind said wheels for earth traversing movement therewith, said arcuately curved outer ends of the tines being extended rearwardly downwardly from said inner end thereof to a position adjacent to the ground and in sliding engagement with said teeth adjacent to the lower periphery of the wheels, and said curved outer ends of the tines slidably engaging successive teeth in radially outwardly upwardly extended relation and having a terminal end coincident with the outer ends of the teeth at the rearwardmost periphery of the wheel to facilitate stripping of forage radially outwardly of the teeth back into forage displaced by the wheels.

12. In a forage harvester having a frame, means mounting the frame for earth traversing movement in a predetermined direction of travel, a plurality of rotary raking wheels, a plurality of circumferentially spaced forage engaging teeth mounted on the wheels in outwardly extended relation from the periphery thereof and having outer ends, axles individual to the raking wheels mounted in the frame in substantially parallel relation and mounting the wheels in substantially erect planes in overlapping echelon relation oblique to the direction of earth traversing movement of the frame whereby during earth traversing movement the fingers of the wheels engage forage disposed on the ground and roll the forage into a window which is passed successively from wheel to wheel and is rolled forwardly by the upward movement of the forwardly disposed sides of the teeth of the rearwardmost peripheral portions of the raking wheels in rolling over the ground and whereby the planes of the wheels are spaced to leave interstices therebetween, auxiliary forage engaging means comprising a plurality of elongated tines, and means mounting the tines individually rearwardly adjacent to the raking wheels, said tines having arcuate portions of a radius substantially equal to the radius of their respective raking wheels disposed adjacent to the ground and in sliding engagement to said teeth adjacent to the lower periphery of the wheels, each of said arcuate portions of the tines being extended rearwardly upwardly in sliding engagement with successive teeth and having a terminal end coincident with the outer ends of the teeth at the rearwardmost periphery of the wheels to facilitate stripping of forage radially outwardly of the teeth back into the windrow being turned by the wheels.

13. In a forage harvester, the combination of a plurality of rotary raking wheels, means mounting the raking wheels for earth traversing movement in substantially erect parallel planes in overlapping echelon arrangement oblique to the direction of movement, the raking wheels having obliquely forwardly disposed sides and being axially spaced to provide interstices therebetween, and a plurality of elongated tines individually borne by the mounting means rearwardly of the raking wheels, said tines having extended ends disposed in the interstices between the raking wheels in substantial alignment with the forwardly disposed sides of the rearwardmost peripheral portions of successive raking wheels to engage forage following its displacement by their respective wheels prior to engagement of the forage by said successive wheels.

14. In a rotary side delivery wheel rake having a frame, means mounting the frame for earth traversing movement in a predetermined direction in relation thereto, a plurality of rotary raking wheels, axles individual to the raking wheels mounted in the frame in substantially parallel relation and mounting the wheels in substantially erect planes in overlapping echelon relation oblique to the direction of earth traversing movement of the frame whereby during earth traversing movement the wheels engage forage disposed on the ground and roll the forage into a windrow which is passed successively from wheel to wheel and is rolled forwardly by the upward movement of the forwardly disposed sides of the rearwardmost peripheral portions of the raking wheels in rolling over the ground and whereby the planes of the wheels are spaced to leave interstices therebetween, auxiliary windrow rolling means comprising a plurality of elongated tines, and means mounting the tines individually rearwardly adjacent to the raking wheels, said tines having arcuate portions of a radius substantially equal to the radius of their respective raking wheels disposed adjacent to the ground in planes substantially parallel to their respective raking wheels, each of said arcuate portions being extended rearwardly to a position substantially aligned with the peripheries of the rake wheels where engaged with the windrow and having a terminal end upwardly extended to facilitate rolling of the forage.

15. In a forage harvester having a frame, means mounting the frame for earth traversing movement in a predetermined direction of travel, a plurality of rotary raking wheels, a plurality of circumferentially spaced forage engaging teeth mounted on the wheels in outwardly extended relation from the periphery thereof and having outer ends, axles individual to the raking wheels mounted in the frame in substantially parallel relation and mounting the wheels in substantially erect planes in overlapping echelon relation oblique to the direction of earth traversing movement of the frame whereby during earth traversing movement the fingers of the wheels engage forage disposed on the ground and roll the forage into a windrow which is passed successively from wheel to wheel and is rolled forwardly by the upward movement of the forwardly disposed sides of the teeth of the rearwardmost peripheral portions of the raking wheels in rolling over the ground and whereby the planes of the wheels are spaced to leave interstices therebetween, auxiliary forage engaging means comprising sets of a plurality of elongated tines, and means mounting the tines individually rearwardly adjacent to the raking wheels, said tines having arcuate portions of a radius substantially equal to the radius of their respective raking wheels disposed adjacent to the ground, each of said arcuate portions of one set of the tines being disposed in sliding engagement to said teeth adjacent to the lower periphery of the wheels and rearwardly upwardly extended therefrom in sliding engagement with successive teeth and having a terminal end coincident with the outer ends of the teeth at the rearwardmost periphery of the wheels to facilitate stripping of forage radially outwardly of the teeth back into the windrow being turned by the wheels, each of said arcuate portions of the other set of the tines being extended rearwardly to a position substantially aligned with the peripheries of the raking wheels where engaged with the windrow and having a terminal end upwardly extended to facilitate rolling of the forage subsequent to engagement by the wheels.

References Cited in the file of this patent

UNITED STATES PATENTS

| | | |
|---|---|---|
| 2,926,481 | Van der Lely et al. | Mar. 1, 1960 |
| 2,972,852 | Van der Lely et al. | Feb. 28, 1961 |

OTHER REFERENCES

German application, E7113, Jan. 5, 1956.
German application, R12485, Jan. 5, 1956.